(12) United States Patent
Ghosh et al.

(10) Patent No.: US 6,435,866 B1
(45) Date of Patent: Aug. 20, 2002

(54) RADIATION FURNACE WITH INDEPENDENTLY CONTROLLED HEATING ELEMENTS

(75) Inventors: Kunal Ghosh, Amherst; Lorraine M. Anders, Williamsville, both of NY (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/785,387

(22) Filed: Feb. 16, 2001

(51) Int. Cl.[7] .............................................. F27B 11/00
(52) U.S. Cl. .......................... 432/206; 432/8; 432/59; 432/36; 219/486; 219/388
(58) Field of Search .............................. 432/206, 8, 59, 432/36; 219/486, 388

(56) References Cited

U.S. PATENT DOCUMENTS

| | | | | |
|---|---|---|---|---|
| 3,582,054 A | * | 6/1971 | Beck ........................... 432/153 |
| 4,060,377 A | * | 11/1977 | Hentz et al. ............. 236/15 BF |
| 5,700,993 A | * | 12/1997 | Counsell et al. ............. 219/483 |
| 5,900,177 A | * | 5/1999 | Lecouras et al. ........... 219/483 |
| 5,915,958 A | * | 6/1999 | Kurie .......................... 219/388 |
| 6,310,328 B1 | * | 10/2001 | Gat ............................. 118/725 |

* cited by examiner

*Primary Examiner*—Jiping Lu
(74) *Attorney, Agent, or Firm*—Patrick M. Griffin

(57) ABSTRACT

A radiation furnace assembly for use in heating parts. The radiation furnace assembly includes a muffle having a top side, a bottom side, and a first side wall. The muffle defines a chamber with a main heating portion and a first side heating portion. Disposed adjacent to the muffle are top and bottom heating elements. A first control device is used to adjust the temperature of at least one of the top and bottom heating elements thus controlling the temperature within the main heating portion of the chamber. A first side heating element is disposed adjacent to the first side wall of the muffle. A second control device is used to adjust the temperature of the first side heating element independently of the top and bottom heating elements to increase the temperature within the first side heating portion of the chamber relative to the main heating portion.

16 Claims, 1 Drawing Sheet

RADIATION FURNACE WITH INDEPENDENTLY CONTROLLED HEATING ELEMENTS

BACKGROUND OF THE INVENTION

1. Field of the Invention

The present invention relates to a radiation furnace assembly for use in heating parts.

2. Description of the Prior Art

Radiation furnace assemblies used to heat parts typically include a muffle surrounded by a casing with top and bottom heating elements located inside the casing. The top and bottom heating elements are positioned adjacent to a top side and bottom side of the muffle to heat a main portion of the chamber within the muffle. The top and bottom heating elements are controlled by either a single control device or independent control devices to adjust the temperature of the elements to maintain a uniform temperature inside the muffle.

It is also common in the art to connect a side heating element to the casing such that it is disposed adjacent to a first side wall of the muffle. The side heating element acts as a separate heating mechanism for heating the main portion of the chamber within the muffle. The side heating element is controlled by the same control device as the top and bottom heating elements. Subsequently, the three heating elements are adjusted simultaneously by the control device.

The disadvantage of the prior art is the inability to increase the temperature in different portions of the chamber independently from the main portion of the chamber. It is common in the brazing industry to braze a part that has a large mass differential on one side. When using a typical radiation brazing furnace with simultaneously controlled heating elements, it is difficult to ensure adequate and efficient brazing throughout the part.

SUMMARY OF THE INVENTION AND ADVANTAGES

The present invention is a radiation furnace assembly for use in heating parts. The radiation furnace assembly includes a muffle having a top side, a bottom side, a first side wall and a second side wall defining a chamber for receiving the part to be heated. The chamber is divided into a main heating portion and a first side heating portion. A casing substantially surrounds the muffle to insulate the chamber and to reflect heat back towards the muffle. Top and bottom heating elements are located inside of the casing and are positioned adjacent to the top side and bottom side of the muffle, respectively. A first control device is connected to at least one of the top and bottom heating elements to adjust their temperature to control the temperature within the main heating portion of the chamber. A first side heating element is also connected to the inside of the casing and is positioned adjacent to the first side wall of the muffle. The first side heating element is positioned to heat the first side heating portion of the chamber. A second control device is connected to the first side heating element to adjust the temperature of the first side heating element independently of the top and bottom heating elements. The second control device is used to increase the temperature within the first side heating portion of the chamber that is adjacent to the first side wall of the muffle.

The primary advantage of the present invention is the ability to create a temperature differential within the chamber by increasing the temperature of the first side heating element independently of the top and bottom heating elements. It is common in the brazing industry to braze a part that has a large mass differential on one side. As such, the sufficiency of brazing is substantially increased by increasing the temperature in the portion of the chamber that houses the largest concentration of mass.

In addition to the aspect of better brazing quality, the use of an independently controlled first side heating element also significantly reduces process time, resulting in higher efficiencies and consequently, less costly parts or assemblies.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
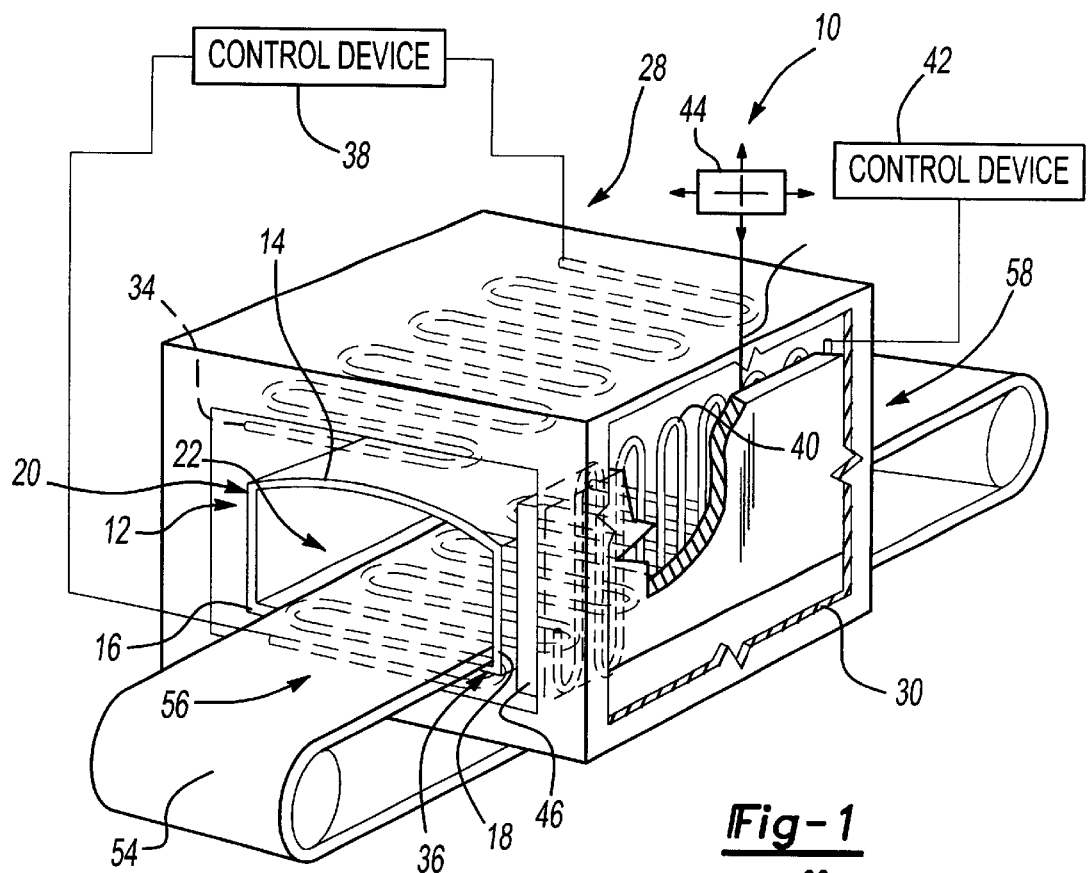
FIG. 1 is a perspective view of a first embodiment of the radiation furnace assembly.

Referring to the Figures, wherein like numerals indicate like or corresponding parts throughout the several views, a first embodiment of a radiation furnace assembly for use in heating parts, specifically for brazing operations, is generally shown at 10.

The first embodiment 10 includes a muffle 12 having a top side 14, a bottom side 16, a first side wall 18 and a second side wall 20. The top side 14 of the muffle 12 is arcuate in shape and the muffle 12 is formed from stainless steel. It is to be understood, however, that the muffle 12 is not limited to this shape or material. The muffle 12 defines a chamber 22 with a main heating portion 24 and a first side heating portion 26. The chamber 22 is oriented to receive the part to be heated.

A casing 28 substantially surrounds the muffle 12. The casing 28 includes a shell 30 typically formed from mild steel that substantially surrounds the casing 28 and an insulation layer 32 that is attached to the shell.

Suspended from the casing 28 and disposed adjacent to the top side 14 of the muffle 12 is a top heating element 34. Also located within the casing 28 and disposed adjacent to the bottom side 16 of the muffle 12 is a bottom heating element 36. The top and bottom heating elements 34, 36 are utilized to heat the main heating portion 24 of the chamber 22. A first control device 38 is connected to the top and bottom heating elements 34, 36 to adjust their temperature and to control the temperature within the main heating portion 24 of the chamber 22. It is to be understood that independent control devices could be used to control the top and bottom heating elements 34, 36 to adjust their temperature and to control the temperature within the main heating portion 24 of the chamber 22.

The radiation furnace assembly 10 further includes a first side heating element 40 connected to the casing 28 and disposed adjacent to the first side wall 18 of the muffle 12 to heat the first side heating portion 26 of the chamber 22. A second control device 42 is connected to the first side heating element 40 to adjust the temperature of the first side heating element 40 independently of said top and bottom heating elements 34, 36 and to increase the temperature within the first side heating portion 26 of the chamber 22 that is adjacent to the first side wall 18. The purpose of which is to reduce temperature differentials or disparities within the part during the heating process.

Figure 2:
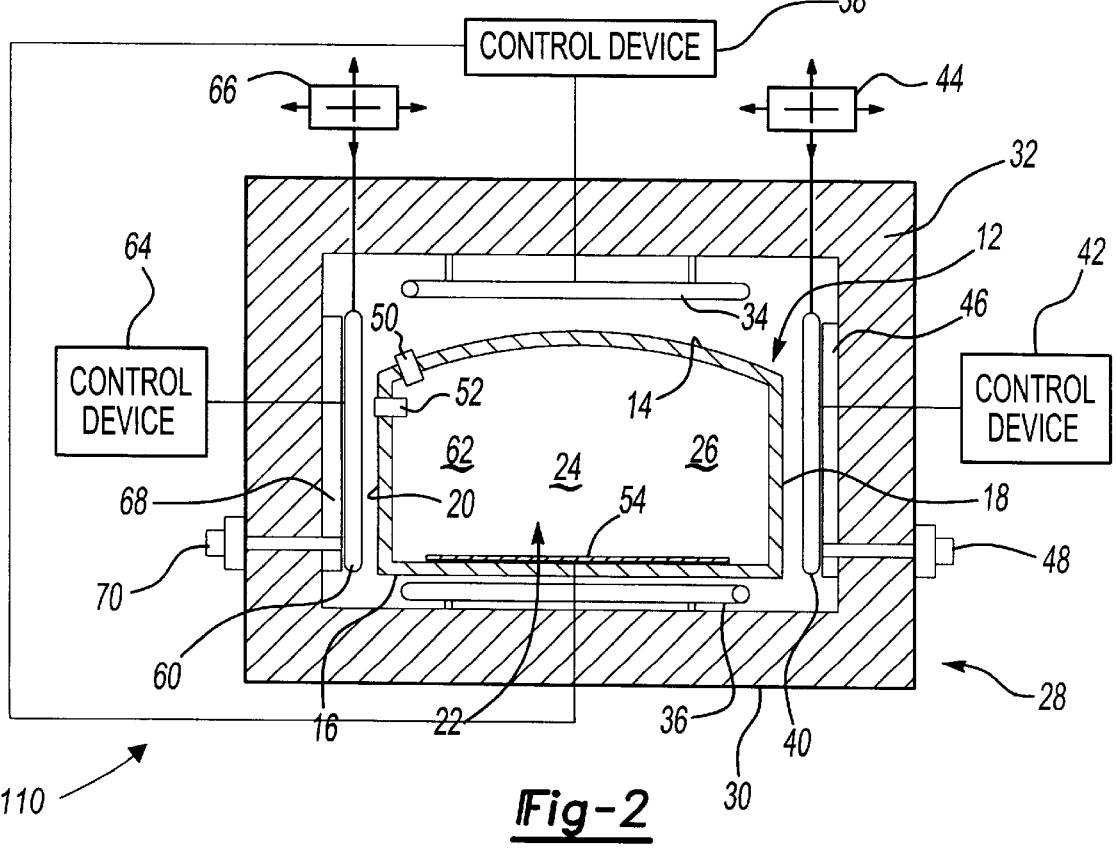
FIG. 2 is a cross sectional view of a second embodiment of the present invention.

The first side heating element 40 includes an adjustment device 44. The adjustment device 44 adjusts the position of the first side heating element 40. More specifically, the adjustment device 44 engages the first side heating element 40 to adjust the position of the first side heating element 40 relative to the muffle 12. In other words, the first side heating element 40 can be raised or lowered within the casing 28 or moved toward or away from the first side wall 18. Adjustment of the position of the first side heating element 40 can be accomplished using a variety of adjustment mechanisms including, but not limited to, hydraulic shafts, levers with locking mechanisms, threaded rods with adjusting nuts, etc. The particular adjustment mechanism used is not intended to limit the scope of the subject invention. Referring to FIGS. 1 & 2, the line extending between the first side heating element 40 and the adjustment device 44 is merely a schematic representation and is not intended to represent structure.

A ceramic block 46 is disposed between the first side heating element 40 and the casing 28 to reflect heat generated by the first side heating element 40 back to the muffle 12. Additionally, a thermocouple 48 is placed near the first side heating element 40 to measure the temperature in the vicinity of the first side heating element 40.

A nitrogen insertion port 50 is connected to the muffle 12 and is used to dispense nitrogen into the muffle 12. The use of nitrogen in the brazing process provides a protective atmosphere to prevent oxidation of the metals that are being brazed.

A thermocouple insertion port 52 is connected to the muffle 12 to allow a user to insert a thermocouple into the muffle 12. The thermocouple insertion port 52 is primarily used to measure the temperature within the chamber 22 and to establish ideal brazing temperatures.

A conveyor belt 54 is utilized to move the part to be brazed into the first open end 56 of the muffle 12 and out the second open end 58 of the muffle 12.

A second embodiment, generally shown at 110 in FIG. 2, includes every feature listed in the previous embodiment, but further includes a second side heating element 60 that is connected to the casing 28 and is disposed adjacent to the second side wall 20 of the muffle 12. The chamber 22 further includes a second side heating portion 62 wherein the second side heating element 60 heats the second side heating portion 62 of the chamber 22. A third control device 64 is connected to the second side heating element 60 to adjust the temperature of the second side heating element 60 independently of the first side heating element 40 and the top and bottom heating elements 34,36.

The second side heating element 60 further includes a second adjustment device 66. The second adjustment device 66 adjusts the position of the second side heating element 60. More specifically, the second adjustment device 66 engages the second side heating element 60 to adjust the position of the second side heating element 60 relative to the muffle 12. In other words, the second side heating element 60 can be raised or lowered within the casing 28 or moved toward or away from the second side wall 20. Adjustment of the position of the second side heating element 60 can be accomplished using a variety of adjustment mechanisms including, but not limited to, hydraulic shafts, levers with locking mechanisms, threaded rods with adjustment nuts, etc. The particular adjustment mechanism used is not intended to limit the scope of the subject invention. Referring to FIG. 2, the line extending between the second side heating element 60 and the second adjustment device 66 is merely a schematic representation and is not intended to represent structure.

In this second embodiment, the radiation furnace assembly 110 also includes a second ceramic block 68 disposed between the second side heating element 60 and the casing 28 to reflect heat generated by the second side heating element 60 back to the muffle 12. A second thermocouple 70 is disposed adjacent to the second side heating element 60 and is used to measure the temperature in the vicinity of the second side heating element 60.

Obviously, many modifications and variations of the present invention are possible in light of the above teachings. The invention may be practiced otherwise than as specifically described within the scope of the appended claims.

What is claimed is:

1. A radiation furnace assembly for use in heating parts, said assembly comprising;

a muffle having a top side, a bottom side, a first side wall and a second side wall defining a chamber having a main heating portion and a first side heating portion for receiving the part to be heated, a casing substantially surrounding said muffle, a top heating element connected to said casing and disposed adjacent said top side of said muffle for heating said main heating portion of said chamber and a bottom heating element connected to said casing and disposed adjacent said bottom side of the muffle for heating said main heating portion of said chamber, a first side heating element connected to said casing and disposed adjacent said first side wall for heating said first side heating portion of said chamber, an adjustment device engaging said first side heating element for adjusting the position of said first side heating element relative to said muffle such that said first side heating element can be raised or lowered within said casing or moved toward or away from said first side wall to control a temperature in said first side heating portion, a first control device connected to at least one of said top and bottom heating elements for adjusting the temperature of at least one of said top and bottom heating elements to control the temperature within said main heating portion of said chamber, and a second control device connected to said first side heating element for adjusting the temperature of said first side heating element independently of said top and bottom heating elements and for increasing the temperature within said first side heating portion of said chamber adjacent said first side wall to reduce temperature differentials within the part during the heating process.

2. An assembly as set forth in claim 1 further including a ceramic block disposed between said first side heating element and said casing to reflect heat generated by said first side heating element towards said muffle.

3. An assembly as set forth in claim 2 further including a thermocouple disposed adjacent said first side heating element for measuring the temperature in the vicinity of said thermocouple.

4. An assembly as set forth in claim 1 further including a second side heating element connected to said casing and disposed adjacent said second side wall, said chamber further includes a second side heating portion wherein said second side heating element heats said second side heating portion of said chamber.

5. An assembly as set forth in claim 1 further including a third control device connected to said second side heating element for adjusting the temperature of said second side heating element independently of said side heating element and said top and bottom heating elements.

6. An assembly as set forth in claim 5 wherein said second side heating element further includes a second adjustment device engaging said second side heating element for adjusting the position of said second side heating element relative to said muffle such that said second side heating element can be raised or lowered within said casing or moved toward or away from said second side wall.

7. An assembly as set forth in claim 5 further including a second ceramic block disposed between said second side heating element and said casing to reflect heat generated by said second side heating element towards said muffle.

8. An assembly as set forth in claim 7 further including a second thermocouple disposed adjacent said second side heating element for measuring the temperature in the vicinity of said second thermocouple.

9. An assembly as set forth in claim 1 further including a nitrogen insertion port connected to said muffle for dispensing nitrogen into said muffle.

10. An assembly as set forth in claim 9 further including a thermocouple insertion port connected to said muffle.

11. An assembly as set forth in claim 10 further including a conveyor belt for moving the part, said muffle further includes a first open end and a second open end wherein said conveyor belt moves through said first open end and said second open end of said muffle.

12. An assembly as set forth in claim 11 wherein said casing further includes a shell substantially surrounding said casing.

13. An assembly as set forth in claim 12 wherein said shell is formed from mild steel.

14. An assembly as set forth in claim 13 wherein said casing further includes an insulation layer attached to said shell.

15. An assembly as set forth in claim 14 wherein said top side of said muffle is arcuate in shape.

16. An assembly as set forth in claim 15 wherein said muffle is formed from stainless steel.

* * * * *